June 28, 1960
J. R. MARTINET
2,943,240
FURNACE STRUCTURES
Filed April 6, 1959
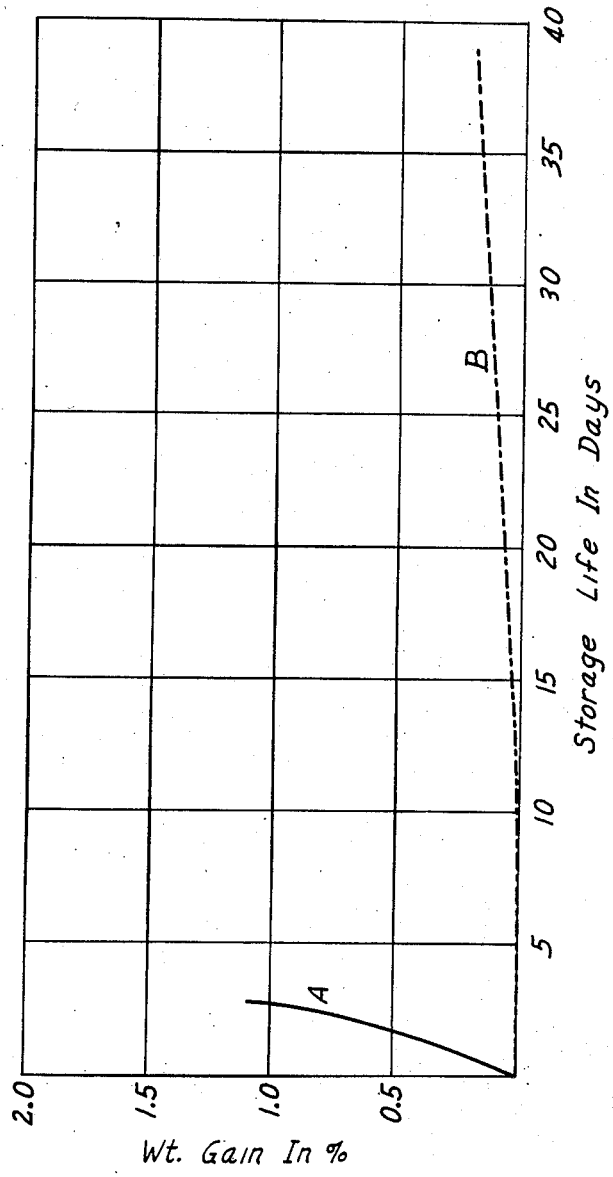
INVENTOR.
Jacques R. Martinet
BY
ATTORNEY

United States Patent Office 2,943,240
Patented June 28, 1960

2,943,240

FURNACE STRUCTURES

Jacques R. Martinet, Cupertino, Calif., assignor to Kaiser Aluminum & Chemical Corporation, Oakland, Calif., a corporation of Delaware Filed Apr. 6, 1959, Ser. No. 804,285

29 Claims. (Cl. 266—43)

This invention relates to a furnace for metallurgical or other high temperature operations; and more particularly, to such a furnace having a metal shell and a basic refractory lining disposed therein.

A great deal of work has been done in the field of production of refractory dolomite linings for metallurgical furnaces, but many problems have been encountered. For example, burned dolomite tends to hydrate readily, and this in turn leads to cracking, loss of strength, and eventually can cause complete disintegration of refractory shapes formed therefrom. Under the best of conditions in the past, dolomite refractories have had short storage life because of the hydration characteristic, and it has been customary to begin firing or use of linings comprising such refractory shapes within twenty-four hours after making, in most instances. At most, such shapes even when composed of a magnesitic dolomite having a high content of magnesium oxide have not been successfully stored for longer than 5 to 7 days. Therefore, it has been necessary for best operation to make such refractories at a location close to where they will be used, so that there will be relatively short lapse of time between making and firing in the furnace. On the other hand, magnesite or magnesia refractories, while having excellent heat resistance and also hydration resistance greatly superior to that of dolomite, are in general more expensive and also less resistant to fluctuations of temperature and tend to spall under such conditions. These characteristics have posed serious problems in the construction of linings for high temperature furnaces, and it is desired to construct furnaces with linings which are resistant to hydration, resistant to spalling, and which are less expensive than the all-magnesia or magnesia-chrome linings heretofore known. Dolomote linings are especially desired in some installations, e.g. steel converters, where the lime content is believed to be advantageous and where chromite may be undesirable because of the tendency of the molten steel to pick up chromium therefrom.

It is an object of this invention, therefore, to provide a hydration-resistant, dolomite-containing lining for metallurgical furnaces. It is a particular object of this invention to provide an improved furnace for high temperature operations comprising a metal shell and a refractory lining consisting essentially of a major portion of coarse grains which are either deadburned dolomite or a mixture of deadburned dolomite grains and magnesia grains, and a minor portion of finely divided magnesia in which substantially all CaO content is in stabilized condition or which magnesia contains substantially no free or uncombined lime, and a small portion of tar or coking carbonaceous binding agent. It is a still further object of the invention to provide a dolomite-containing refractory lining material for use in furnaces which has an extended storage life; and which is resistant to crumbling, swelling and other deteriorative manifestations under ordinary storage or shipping conditions; and which exhibits such resistance for an extended time.

According to the present invention, there is provided a furnace suitable for high temperature operations in various metallurgical processes, such furnace including a metal shell, and a refractory lining disposed therein and consisting essentially of a major portion, or at least 50%, of a coarse non-acid grain portion, at least a major or preponderant part of which is fired or deadburned dolomite grains, such grains being of particle size not less than 35 mesh, and a minor portion of finely divided magnesia, i.e. passing 35 mesh, and a small amount of a nonaqueous cokable carbonaceous bonding agent for example, tar. The refractory or mineral components, e.g. the dolomite and magnesia, are mixed together, and are admixed with the tar, both the mineral components and the tar preferably being heated prior to mixing.

The dolomite useful in this invention is a fired or deadburned dolomite, and it comprises at least the major portion of the coarse grain portion or fraction, i.e. of particle size not less than 35 mesh. The dolomite may be a true dolomite or a magnesitic dolomite or a dolomitic limestone, all of which, as is well known, commonly exhibit hydration tendencies upon standing, even though "deadburned" to an otherwise very useful and well-sintered refractory grain. The material can be employed in kiln run sizes down to 35 mesh, that is, where the largest particles are about ¾ inch in diameter. In a preferred embodiment the fired dolomite is of graded particle sizing selected for good packing, for example, passing 3 mesh and retained on 35 mesh. In another variation of this invention the coarse grain fraction of the mix, of the particle sizes described above, consists of a mixture of dolomite grains and deadburned magnesite or other non-acid grains, but contains at least 60% dolomite based on the total weight of this coarse fraction, i.e. at least 30% of the mix based on the total weight of refractory component. In other words, up to 40% of the dolomite is substituted for or replaced by another non-acid grain material, for example, magnesia, such as deadburned magnesite containing from 60 to 90% MgO or periclase grains containing more than 90% magnesium oxide, or both, if desired. In one very useful embodiment, the coarse fraction contains from 60% to 90% dolomite passing 10 mesh and retained on 35 mesh and from 10% to 40% of such other non-acid grain material retained on 10 mesh. Furthermore, in a preferred variation to increase hydration-resistance still further, the other non-acid grain material, preferably magnesia grains, comprises the coarsest portion of the mix and is employed in grain sizes of not less than 10 mesh or preferably in sizes passing 4 mesh and retained on 10 mesh and the dolomite is then used in particle sizes passing 10 mesh and retained on 35 mesh, preferably retained on 20 mesh, as the remainder of the coarse fraction or portion. The incorporation of a minor amount of other non-acid grain, such as magnesia, in the coarse fraction is advantageous because, especially in the event that a weak dolomite grain is employed, the other coarser grain, such as magnesia, sustains the main stress of the forming pressures when the refractory batch is placed in the lining or shaped into blocks, bricks, etc., either by forming in a brick press or by jack hammering, ramming, or other forming means. In the application of such pressures, weak grains will tend to undergo some amount of breakdown or disintegration, and the incorporation of other coarse grains as defined, these grains having greater compressive strengths and greater hydration resistance, prevents such breakdown in the weaker dolomite because the latter is largely "sheltered" within the interstices of the coarser magnesia or other grain framework. It is to be understood that in the operations of mixing and forming, some small accidental amount of finer-sized dolomite may be worn off the larger grains or may be present due to normal inefficiencies in commercial screening practice, but essentially all the dolomite is retained on 35 mesh. In some operations and for some furnace linings other non-acid, hydration-resistant coarse grains can be employed with the coarse dolomite grains instead of, and in the same amounts and manner as described for, the coarse magnesia grains above mentioned. Thus, there can be employed in the fraction retained on 35 mesh such minor amounts of grains of higher compressive strengths, of chromite, alumina, spinels including magnesium aluminate, magnesium chromite, magnesium ferrite or other spinels, or any desired admixture of such coarse grains, if desired in admixture with the coarse magnesia, also. However, for use in converters wherein steel is refined or produced by blowing with oxygen-enriched gas, it is preferred to employ the magnesia-dolomite coarse fraction or portion described above because, for instance, pick-up of chromium from chromite grains would not be desired. The coarse magnesia grains useful herein are of any desired composition. For instance, these magnesia grains can be of the same mineral or chemical composition as described below for the finer magnesia component, but alternatively the coarser magnesia grains can be of a composition differing from that of the finely divided magnesia component. The coarse magnesia grains are deadburned.

The finely divided portion of the refractory batch consists of magnesia of particle size passing 35 mesh. Preferably, a substantial portion of this finer fraction, e.g. at least 30% thereof, passes 100 mesh. The batch contains from 15% to 50% of the finely divided magnesia, preferably deadburned, based on the total weight of refractory or mineral components. In order to impart highest hydration-resistance and effect excellent storage life to the refractory products of this invention, the finely divided magnesia is hydration-resistant under conditions of use, and substantially all CaO present as impurity in such magnesia is stabilized against hydration by being combined with other impurities present to form compounds which do not readily hydrate under conditions of storage and use such as calcium ferrite, calcium silicates, calcium magnesium silicate, etc. The magnesia is preferably deadburned to insure such stabilization of the lime content and formation of the hydration-resistant calcium compounds. There is for best hydration-resistance substantially no uncombined or free lime or CaO present in the finely divided magnesia. The starting magnesium compound which is deadburned to form the bonding magnesia normally contains, in addition to CaO impurity, other impurities which will react with the lime, CaO, to form the stabilized compounds. However, if necessary, sufficient silica or iron oxide can be added before such deadburning in order to react completely with the CaO to form the stabilized compound. Preferably, the finely divided magnesia contains at least 85% magnesium oxide; and for the best properties in the final product, the finely divided magnesia contains at least 90% MgO. Preferably the fine magnesia contains not over 4% calcium, calculated as CaO. With high MgO content in the finer or bond portion, the refractory products exhibit greater resistance to chemical attack, e.g. by steel-making slags.

The cokable carbonaceous bonding material or agent is added in small amount, preferably from 4% to 10%, by weight, based on the total weight of the refractory components; e.g. with 100 total parts by weight of a mixture of coarser dolomite component and finer magnesia component, are admixed from 4 parts to 10 parts by weight of cokable, carbonaceous bonding material. Such carbonaceous material is suitably coal tar, pitch, tar, asphalt, gilsonite or the like. In a preferred operation, it is advantageous to incorporate in the cokable material a small amount, up to 3%, of a surface active agent having a tar-soluble hydrocarbon group containing at least six carbon atoms, and a polar group, such as a carboxylic acid or soap of a carboxylic acid, such as a fatty acid, a long chain aliphatic amine or amide, or a sulfonated or sulfated aliphatic compound containing at least six carbon atoms. It is preferred to use a high fixed carbon, hard, or high softening point, tar, for instance, a tar having a softening point of at least 50° C., and having a low moisture content, preferably not over about 0.1% moisture content. Coal tar is an excellent carbonaceous bonding material for use in the present invention. Preferably, the carbonaceous bonding material is in liquid form or is heated to liquefaction prior to admixture with the refractory components.

In making up a refractory batch according to the present invention, the mineral portion, that is, the coarse and the fine fractions are intimately intermixed and are thoroughly intermixed with the carbonaceous bonding material. In a preferred embodiment, the coarse grain fraction of dolomite or a mixture of dolomite and magnesia or other non-acid grains of the amounts and grain sizes described hereinabove is admixed with the carbonaceous bonding agent and this admixture is then mixed with the finely divided magnesia component as described above. In a preferred mode of carrying out this invention, the carbonaceous bonding material is heated to a temperature at which it is in liquid, or flowable, state, and the refractory material is heated to about the same temperature; and the two materials are then admixed in such heated state, preferably in the sequence of steps described above, although other sequential steps can be practiced, if desired. Suitably, both materials are heated to a temperature of from 100° C. to 125° C., especially when coal tar is employed as bonding material.

The admixed batch can then be applied as patching material in a furnace lining, or formed into a furnace lining by any desired method, many such methods being well known to the art. The batch can alternatively be formed in bricks, blocks, or other shaped articles. The forming of shapes can be carried out in any commercial or industrial brick press as known to the art, and where high forming pressures are employed, the incorporation of up to 40% of the coarse fraction of coarse magnesia grains, as above described, is especially advantageous in avoiding changes of granulometry by the pressing operation. However, to avoid cracking of the dolomite grains, especially when a weaker dolomite (that is, of relatively low compressive strength) is used, it is especially advantageous to form shaped articles in a vibratory press whereby there are employed forming pressures of not over 3000 lbs., preferably not over 1000 lbs., per square inch. In one advantageous mode of operation, the refractory batch is filled into the mold, vibration alone is applied until the mold is filled and then low pressure is applied to the mass in the mold and gradually increased, while still vibrating, up to the top pressure which it is desired to apply, e.g. up to 3000 p.s.i., or preferably up to 1000 p.s.i. Vibration can be carried out by applying vibrators, as desired, laterally to the mold for the furnace lining section, e.g. a bottom section, or for the brick or block. Alternatively, vibrators, as desired, can be applied to the top or the bottom of the bricks. Vibration is then applied in the known way. In forming a furnace lining, in one embodiment, the refractory batch is placed in the desired location and then tamped in with the aid of a jack hammer, and in this mode of operation it is preferred that the coarse grain fraction contain from 10% to 40% thereof of coarse magnesia grains as described above. The bricks or blocks are suitable for storing or shipping and can be burned in after installation in a furnace. In firing, it is suitable to heat at such a rate that coke forms rapidly, but at such rate that the vapors being evolved do not disrupt the face of the brick or lining mass, these heating precautions being known to the art.

It is an advantage of the present invention that dolomite-containing furnace linings are produced which have greatly improved hydration resistance; and the refractory product made according to this invention can be stored or held, before installation in the furnace lining, for greatly increased periods of time, thus enabling, for example, the production of the refractory mass at an economically advantageous factory site with subsequent shipment to the place of use. In employing both dolomite and magnesia as described herein, it is an advantage that the product exhibits greatly increased spalling resistance over that of an all-magnesia batch, and exhibits increased refractoriness as compared with an all-dolomite mix, so that the furnace lining is useful for operating at very high temperatures, e.g. in electric furnaces. It is an advantage of this invention that refractory masses made according to the invention exhibit very little swelling or cracking or gain in weight, from either hydration or carbonation, after prolonged storage times, the gain in weight generally being less than 0.5% even after a storage time of thirty days. It is a further advantage that after firing and coking of the binder the refractory products made according to this invention exhibit excellent strength, spalling resistance, and resistance to hydration, carbonation, swelling, cracking and gain in weight.

It is a further advantage of a refractory mass containing deadburned dolomite as coarse grain material and finely divided magnesia as bonding ingredient or agent, as shown above, that peeling or flaking of the product upon firing is prevented or minimized. For example, upon heating in a furnace a brick made according to the present invention, there is substantially no excessive growth with subsequent peeling off of the hot face of the brick upon heating or firing and then cooling. This is in contrast to the behavior of an all-magnesia brick, e.g. whereof the hot face peels off upon repeated firings in place, i.e. exhibits growth especially adjacent the hot face and this zone peels off rather readily upon subsequent cooling.

The figure shows in graphic form one advantageous result of the practice of this invention wherein present gain in weight is plotted against storage life in days. In the series of tests which provided the results graphically shown in the figure, curve A was determined by preparing a mix consisting of 70% of a batch of deadburned dolomite of grain sizes selected to pass 4 mesh and be retained on 20 mesh, 30% of dolomite of the same batch passing 100 mesh, and 6.75% coal tar calculated on the total weight of dolomite, heating the coal tar to fluidity and heating the dolomite material to the same temperature, admixing while heated and then forming into shapes under a pressure of 8000 lbs. per sq. in. The bricks of test A were then held in an open room under normal atmospheric conditions; and the gain in weight was determined each day. At the end of three days, the bricks were cracked and disintegrating, that is, they could be broken apart by hand and were unfit for use as components of a furnace lining. The bricks of test B were made up by mixing 70% of deadburned dolomite passing 4 mesh and retained on 20 mesh, and 30% of deadburned magnesite passing 100 mesh, and 6.75% tar, and admixing in the same manner as in test A. The bricks are formed in a brick mold by vibration while applying a pressure of 375 lbs. per sq. in. and stored as described for test A. At the end of 40 days' storage, the bricks are still in good and usable condition and have gained only about 0.2% in weight.

The following examples will demonstrate various modes of carrying out the present invention.

EXAMPLE 1

A lining for a Bessemer converter, to be used in producing steel by the method including top-blowing with a stream of oxygen gas, is made of bricks prepared in the following manner. There is prepared an amount of deadburned dolomite of the following composition on the ignited basis: 1.3% $SiO_2$, 5.2% $R_2O_3$ ($Fe_2O_3$ and $Al_2O_3$), 57.0% CaO; 0.4% ignition loss; 36.1% MgO, by difference. The dolomite is screened to the following particle size composition:

| | Percent by weight of total mineral batch |
|---|---|
| Passing 3 mesh, retained on 4 mesh | 10.65 |
| Passing 4 mesh, retained on 6 mesh | 10.65 |
| Passing 6 mesh, retained on 8 mesh | 10.72 |
| Passing 8 mesh, retained on 10 mesh | 10.60 |
| Passing 10 mesh, retained on 14 mesh | 5.35 |
| Passing 14 mesh, retained on 20 mesh | 3.16 |
| Passing 20 mesh, retained on 35 mesh | 8.52 |
| Passing 35 mesh, retained on 65 mesh | 5.35 |
| Total | 65.00 |

With this is admixed 35% by weight of the total mineral batch of periclase passing 100 mesh and of the following composition: 1.0 CaO, 2.5% $SiO_2$, 0.9% $Cr_2O_3$, 0.4% $Fe_2O_3$, 0.2% $Al_2O_3$, 0.8% ignition loss, 94.2% MgO (by difference).

An amount of coal tar is employed of the following typical characteristics: Softening point (cube in water) 137° F.; bitumen soluble in carbon disulfide, 83.76%; specific gravity, 25° C./25° C., 1.253; coking value (Conradson method), 36.5; benzol insoluble, 16.1%; free carbon, 2.28%; distillation: 0–170° C., 0%; 0–200° C., 0%; 0–270° C., 0%; 0–300° C., 1.2%; 0–355° C., 17.0%.

The tar is heated in a kettle to the flowing point, e.g. about 110° C. The mineral components are placed in an oven and are also heated to about the same temperature. Then the liquefied coal tar is mixed with the dolomite grains in an amount to provide 6.75% tar calculated on the total mineral component. That is, if a batch contains 65 parts by weight dolomite and 35 parts by weight magnesite, there will be added 6.75 parts by weight of the tar.

The dolomite and tar are thoroughly intermixed while maintaining the temperature at about 110° C. After this mixing is effected, the periclase portion, also heated to the stated temperature, is added in the mixer and the whole thoroughly blended.

The blended batch is now formed into bricks by pressing under 8,000 to 10,000 p.s.i. while maintaining the die of the brick press at about the same temperature as above, i.e. about 110° C. Bricks so made have excellent density and exhibited a storage life of from 2 to 3 times the storage life of bricks made in the same way except that the fine mineral portion, i.e. that passing 100 mesh, consisted of dolomite.

EXAMPLE 2

Another set of bricks is made up in exactly the same manner as in Example 1, except that instead of pressing, the bricks are formed under 375 p.s.i. pressure and are compacted by vibration at a frequency of 3600/min. Bricks made according to this example exhibit an average storage life 4 to 5 times that of bricks made and pressed according to Example 1.

EXAMPLE 3

A refractory batch is prepared by admixing periclase of the following analysis: 5.7% $SiO_2$, 0.7% $Fe_2O_3$, 0.3% $Al_2O_3$, 1.2% CaO, 92.1% MgO (by difference), in the following particle sizes and amounts:

| | Percent of total mineral component |
|---|---|
| Passing 4 mesh, retained on 6 mesh | 10 |
| Passing 6 mesh, retained on 8 mesh | 5 |
| Passing 8 mesh, retained on 10 mesh | 5 |
| Total | 20 | and deadburned dolomite of the same composition as in Example 1, in the following particle sizes and amounts:

| | Percent of total mineral component |
|---|---|
| Passing 10, retained on 14 mesh | 23 |
| Passing 14, retained on 20 mesh | 27 |
| Passing 20, retained on 35 mesh | 13 |
| Total | 63 |

The above grains are heated to about 125° C. and are mixed with coal tar as used in Example 1, heated to the same temperature (125° C.) and then there is added in the mixer 17% of the same periclase ground to pass 100 mesh and heated to the same temperature.

This batch is then formed into bricks by pressing as in Example 1. The storage life of these bricks is 3 to 4 times the storage life of brick made in the same way except that the fines portion is of dolomite instead of periclase.

Bricks made according to Example 1 above were tested for erosion resistance in a small test converter under conditions simulating the operation of an oxygen-top-blown steel converter. The test furnace was lined with the bricks to be tested, employing a portion of the same refractory batch as mortar in the joints between bricks, and the furnace was fired up at such rate as to coke the binder rapidly while simultaneously avoiding disruption of the brick surfaces by too rapid evolution of the vapors. Suitably, the furnace is heated at a rate of 400° C. per hour. The furnace is then charged with pig iron and scrap steel; lime is added to form a slag; and the metal is melted. The molten, slag-covered mass of metal is blown with oxygen introduced through a vertical tube suspended over the melt and terminating a few inches above the normal melt surface. After the blow is completed, as observed by the shortening of the flame, the flow of oxygen is stopped and the metal and slag contents are tapped off. The minimal thickness of the brick at the slag line is measured after several such blowing cycles. The brick exhibit an average loss in thickness of from 12.5 to 16% as compared with such average loss of 25 to 29% observed in similar tests with brick made in the same manner except that they are composed entirely of dolomite and contain no magnesia.

In a typical series of tests demonstrating the superior erosion-resistance of refractories made according to this invention, batches are made up as follows: Each batch contains 70% of a coarse fraction of grain sizes passing 4 and retained on 35 mesh and 30% of a fine fraction passing through 35 mesh, including 16.7% passing 100 mesh. Each batch also contains 4½% coal tar as a bonding agent; and each batch is made up by heating the tar to its flow point, heating the coarse and fine fractions to the same temperature, mixing the tar and coarse fraction and then adding thereto the fine fraction and thoroughly intermixing. The batches are then formed, respectively, into 9″ x 4½″ x 3″ bricks. Bricks of each batch are placed in the lining of the small converter described above, and the converter or furnace is preheated to about 1800° F. The charge of iron, scrap and slag-former described above is charged in and oxygen is introduced, the converter being slowly rotated throughout the test to equalize conditions of attack on all test pieces. After the blow is ended, the charge is tapped off and a fresh charge added, and this is continued for the number of cycles shown in the table below, after the last one of which the furnace is allowed to cool and erosion loss is determined by measuring the percentage of thickness which has been cut away at the point of deepest attack, the original thickness having been three inches. As stated, the batches were all made up by the above procedural steps, except that the refractory materials differed. In batch I, both coarse and fine fractions consist of deadburned dolomite of the following analysis: 1.23% $SiO_2$, 4.69% $Fe_2O_3$, 0.41% $Al_2O_3$ (by difference), 53.45% CaO and 40.22% MgO (by difference); in batch II, both fractions are magnesite containing 85% MgO, the remainder being principally the usual imprities, lime, alumina, iron oxide and silica; in batch III, the coarse fraction consists of deadburned dolomite as in batch I and the fine fraction, of deadburned magnesite of the following analysis: 1.3% $SiO_2$, 5.0% $Fe_2O_3$, 0.2% $Al_2O_3$, 4.0% CaO and 89.5% MgO (by difference); in batch IV, the coarse fraction and the fine fraction consists of dolomite of the following analysis: 0.90% $SiO_2$, 6.25% $Fe_2O_3$, 1.31% $Al_2O_3$ (by difference), 54.08% CaO and 37.46% MgO (by difference); in batch V, the coarse fraction consists of dolomite as in batch I, and the fine fraction, of periclase of the following analysis: 5.7% $SiO_2$, 0.7% $Fe_2O_3$, 0.3% $Al_2O_3$, 1.2% CaO and 92.1% MgO (by difference). The table below shows the weight percent loss by erosion and the number of melts or cycles per test.

*Table*

| Batch | Percent Loss, Weight | Slag Former Added in Converter | No. Melts |
| --- | --- | --- | --- |
| I | 29 | $CaCO_3$ | 4 |
| II | 25 | $CaCO_3$ | 4 |
| III | 17 | $CaCO_3$ | 4 |
| IV | 45.8 | Fluorspar | 3 |
| V | 12.5 | Fluorspar | 3 |

It can be seen that batches III and V, which are made according to the present invention, are superior in erosion resistance compared with all fired dolomite or all magnesia mixes. Bricks made according to this invention exhibit, therefore, greatly increased erosion resistance, and they also are of very good densities. The all magnesite bricks made as described in test II exhibit peeling at the hot face. That is, after firing and then cooling, the brick material up to about one-half inch back from the hot face surface tends to separate as a layer from the remainder of the brick and can be easily pulled or peeled off. The rather large loss in weight of this batch as shown in the above table is due in part to such peeling. This tendency is overcome or greatly minimized by forming the brick of coarse dolomite grains and finely divided magnesia or magnesite. Also, chemical or slag attack is greatly reduced due to the incorporation of the magnesia fines according to the invention, whereas an all-dolomite brick is severely chemically attacked as indicated by the results with batch I, for example.

It has been found, also, in a series of comparative tests that refractories made according to the present invention exhibit a spalling resistance which is about 6 times better than that of brick made in the same manner except that the latter contain only magnesia in the coarse and fine fractions; and that the spalling resistance of the bricks made according to this invention is at least as good as that of brick which have otherwise been made by the same method except that both the coarse fraction and the fine fraction consist of dolomite. It has further been found that the addition of a small amount, up to about 3%, of a surface active agent, or a wetting agent, substantially improves the density of refractories made according to the invention and also appreciably further improves the storage life thereof. A suitable surface active agent is a polar compound having a tar-soluble group and a polar group. For example, a long chain fatty acid, such as stearic acid, is useful, but other surface active agents can be advantageously employed.

Other cokable carbonaceous binders, which are likewise non-aqueous, can be used in the invention, as previously described. When forming shapes according to this invention by filling into a mold or molding zone while vibrating said mold and applying low pressures of up to not over 3000 p.s.i., preferably up to not over 1000 p.s.i., it is preferred to heat the carbonaceous bonding agent described to liquefaction, to facilitate thorough mixing and good tailoring of the product. When coarser magnesia grains are also incorporated, lower amounts of such carbonaceous binders are useful within the ranges of amounts shown herein.

It is preferred to employ, as fine material, magnesia or magnesite containing at least about 90% MgO. For best hydration resistance and suitable storage life, if the magnesia contains lime impurity—and commercial magnesias or deadburned magnesite do generally contain such lime—the magnesia will have been so thoroughly fired that the lime will have entered into combination with other normal impurities, such as silica, alumina and iron oxide, to form, for example, Ca silicate or Ca ferrite or other substantially non-hydrating Ca compound. The term "magnesia" or "magnesite" is intended to mean the material consisting predominantly of magnesium oxide and preferably substantially free of uncombined lime as described above, when such term is used to describe the finely divided magnesia bonding material. It is to be noted that, in that the coarse fraction is composed of fired dolomite grains or a mixture of fired dolomite grains and other non-acid grains as described herein, and the finely divided fraction is composed of magnesia or magnesite, which is of a different mineral character than the dolomite of the coarse fraction, a great advantage is obtained by this invention because the tendency of the fired product made therefrom to peel upon cooling is minimized or eliminated. This particular advantage has been found to be obtained even though a small amount of uncombined lime may be present in the fines portion and the hydration resistance may not be the maximum obtainable by substantial elimination of free lime from such magnesia fines.

Amounts and percentages referred to in the specification and claims are by weight unless otherwise indicated. Mesh sizes referred to herein are Tyler standard screen sizes, which are defined in Chemical Engineers' Handbook, John H. Perry, editor-in-chief, second edition, 1941, published by McGraw Hill Book Company, at page 1719. For convenience, the fired dolomite component is sometimes referred to herein merely as "dolomite," and this term is to be understood to refer to dolomite which has been fired and deadburned, for example, by heating to 1550° C. to 1800° C. until deadburned, unless otherwise indicated. As shown herein, the fired dolomite is substantially entirely (at least 90%) retained on 35 mesh. Where mineral components are referred to, the term is to be understood to include the metal oxides or compounds and to exclude the carbonaceous bonding agent. In the specification and claims, analyses where given are reported in the usual manner, expressed as simple oxides, although the components may actually be present in combination with each other.

This application is a continuation-in-part of my copending application, Serial No. 638,738, filed December 17, 1956.

Having now described the invention, what is claimed is:

1. In a furnace for operation at high temperatures, a metal shell, and disposed therein a basic refractory lining consisting essentially of an intimate mixture of a major portion of fired dolomite grains, of particle sizes retained on 35 mesh, and a minor portion of magnesia passing 35 mesh, and a small amount of nonaqueous cokable, carbonaceous bonding agent.

2. In a furnace for operation at high temperatures, a steel shell, and disposed therein a basic refractory lining consisting essentially of an intimate admixture of a major portion of fired dolomite grains of sizes retained on 35 mesh, and a minor portion of magnesia passing 35 mesh, and a small amount of tar.

3. In a furnace for operating at high temperatures, a steel shell and disposed therein a basic refractory lining consisting essentially of an intimate admixture of a major portion of fired dolomite of grain size passing 3 mesh and retained on 35 mesh, and a minor portion of magnesia passing 35 mesh, and a small amount of tar bonding agent.

4. Structure as defined in claim 3, wherein a substantial portion of said magnesia is of particle size passing 100 mesh.

5. Structure as in claim 4 wherein there is added as bonding agent from 4% to 10% of said tar.

6. Structure as in claim 4 wherein said lining contains fired dolomite grains of particle size passing 8 mesh and a major portion retained of 20 mesh.

7. Structure as in claim 4 containing from 15% to 50% of said magnesia, based upon the total mineral components of the mixture.

8. In a furnace structure for operating at high temperatures, a steel shell and disposed therein a basic refractory lining containing at least 50% of a coarse mineral fraction which consists essentially of from 60% to 90% fired dolomite passing 10 mesh and retained on 35 mesh and from 10% to 40% of other non-acid grains retained on 10 mesh, and from 15% to 50% of a fine fraction consisting of magnesia passing 35 mesh and having a substantial portion passing 100 mesh, and from 4% to 10% tar bonding agent based on the total weight of mineral components.

9. Structure as in claim 8 wherein said non-acid grains are magnesia grains.

10. Unfired refractory batch consisting essentially of an intimate admixture of a major portion of fired dolomite grains of particle size not less than 35 mesh and a minor portion of magnesia of particle size passing 35 mesh, and a small amount of cokable carbonaceous bonding agent.

11. Batch as in claim 10 wherein a substantial portion of said fine fraction passes 100 mesh.

12. Batch as in claim 10 containing in addition a small amount, up to 3%, of a surface active agent.

13. Unfired refractory batch consisting essentially of an intimate admixture of a major portion of a coarse grain fraction of the group consisting of fired dolomite and a mixture of fired dolomite and other non-acid grains and retained on 35 mesh, a minor portion of magnesia particles passing 35 mesh, and a small amount of cokable carbonaceous bonding agent.

14. Method of making a refractory product which comprises preparing a refractory batch composed of a major portion of fired dolomite grains of particle size not less than 35 mesh and a minor portion of magnesia particles and passing 35 mesh and having a substantial portion passing 100 mesh, heating said batch to a temperature of from 100° C. to 125° C., heating tar to said temperature, and admixing with said refractory batch from 4% to 10% of said tar to form an intimate and uniform mixture.

15. Method for making a refractory product which comprises preparing a refractory batch composed of a major portion of coarse grains of at least one substance of the group consisting of fired dolomite and a mixture of fired dolomite and other non-acid grains, said coarse grains being of particle size not less than 35 mesh, and a minor portion of magnesia particles passing 35 mesh and having a substantial portion passing 100 mesh, heating an amount of tar to fluidity, heating said coarse grains and said magnesia to the same temperature as the tar, admixing said coarse grains and said tar to form a uniform admixture, then admixing said magnesia grains therewith.

16. In a furnace for operating at high temperatures, a steel shell and disposed therein a basic refractory lining consisting essentially of an intimate admixture of a major portion of coarse grains of at least one substance of a group consisting of fired dolomite and a mixture of from 60 to 90% of fired dolomite grains retained on 35 mesh and from 10% to 40% of other nonacid grains retained on 10 mesh, and a minor portion of finely divided magnesia, and a small amount of tar bonding agent.

17. Unfired shaped refractory consisting essentially of an intimate admixture of a major portion of fired dolomite grains of a particle size not less than 35 mesh and a minor portion of magnesia of particle size passing 35 mesh, and a small amount of cokable carbonaceous bonding agent.

18. Unfired shaped refractory consisting essentially of an intimate mixture of a major portion of a coarse grain fraction of a substance of the group consisting of fired dolomite and a mixture of fired dolomite and other non-acid grains and retained on 35 mesh, and a minor portion of magnesia particles passing 35 mesh, and a small amount of cokable carbonaceous bonding agent.

19. In a furnace for operation at high temperatures, a metal shell, and disposed therein a basic refractory lining consisting essentially of an intimate admixture of a major portion of fired dolomite grains of particle sizes retained on 35 mesh, and a minor portion of magnesia passing 35 mesh and substantially free of uncombined CaO, and a small amount of non-aqueous, cokable, carbonaceous bonding agent.

20. Structure as defined in claim 19, wherein a substantial portion of said magnesia is of particle size passing 100 mesh.

21. Unfired refractory batch consisting essentially of an intimate admixture of a major portion of a coarse grain fraction of the group consisting of fired dolomite and a mixture of fired dolomite and other non-acid grains and retained on 35 mesh, a minor portion of magnesia particles passing 35 mesh, said magnesia particles being substantially free of uncombined CaO, and a small amount of non-aqueous, cokable carbonaceous bonding agent.

22. Batch as in claim 21 wherein a substantial portion of said fine fraction passes 100 mesh.

23. Batch as in claim 21 containing in addition a small amount, up to 3%, of stearic acid.

24. Batch as in claim 21 wherein said magnesia contains not over 4% calcium, calculated as CaO.

25. Method of making a refractory product which comprises preparing a refractory batch composed of a major portion of coarse grains of at least one substance of the group consisting of fired dolomite and a mixture of fired dolomite and other non-acid grains, said coarse grains being of particle size not less than 35 mesh, and a minor portion of magnesia particles passing 35 mesh substantially free of uncombined CaO and having a substantial portion passing 100 mesh, heating an amount of tar to fluidity, heating said coarse grains and said magnesia to the same temperature as the tar, admixing said coarse grains and said tar to form a uniform admixture, then admixing said magnesia particles therewith.

26. Process for making a shaped refractory product which comprises preparing a refractory batch consisting essentially of an admixture of a major portion of coarse grain material not passing 35 mesh and chosen from the group consisting of deadburned dolomite grains and a mixture of deadburned dolomite grains and other non-acid grains, a minor portion of finely divided magnesia, substantially free of uncombined CaO and a small amount of non-aqueous, cokable, carbonaceous bonding agent, said bonding agent being heated to liquefaction, feeding said admixture into a mold while vibrating until said mold is filled, then applying low pressure to the refractory material in said mold, and increasing said pressure up to not over 3000 p.s.i. while vibrating to form said shaped refractory.

27. Unfired refractory batch consisting essentially of an intimate admixture of a major portion of fired dolomite grains of particule size of not less than 35 mesh, a minor portion of magnesia of particle size passing 35 mesh and substantially free of uncombined CaO, a small amount, up to 3%, of a surface active agent, and a small amount of cokable carbonaceous bonding agent.

28. Unfired shaped refractory consisting essentially of an intimate mixture of a major portion of a coarse grain fraction of a substance of the group consisting of fired dolomite and a mixture of fired dolomite and other nonacid grains and retained on 35 mesh, a minor portion of magnesia particles passing 35 mesh and substantially free of uncombined CaO, and a small amount of cokable carbonaceous bonding agent.

29. Unfired shaped refractory consisting essentially of an intimate admixture of a major portion of fired dolomite grains of a particle size not less than 35 mesh, a minor portion of magnesia of particle size passing 35 mesh and being substantially free of uncombined CaO, and a small amount of cokable carbonaceous bonding agent.

No references cited.